Patented Sept. 16, 1924.

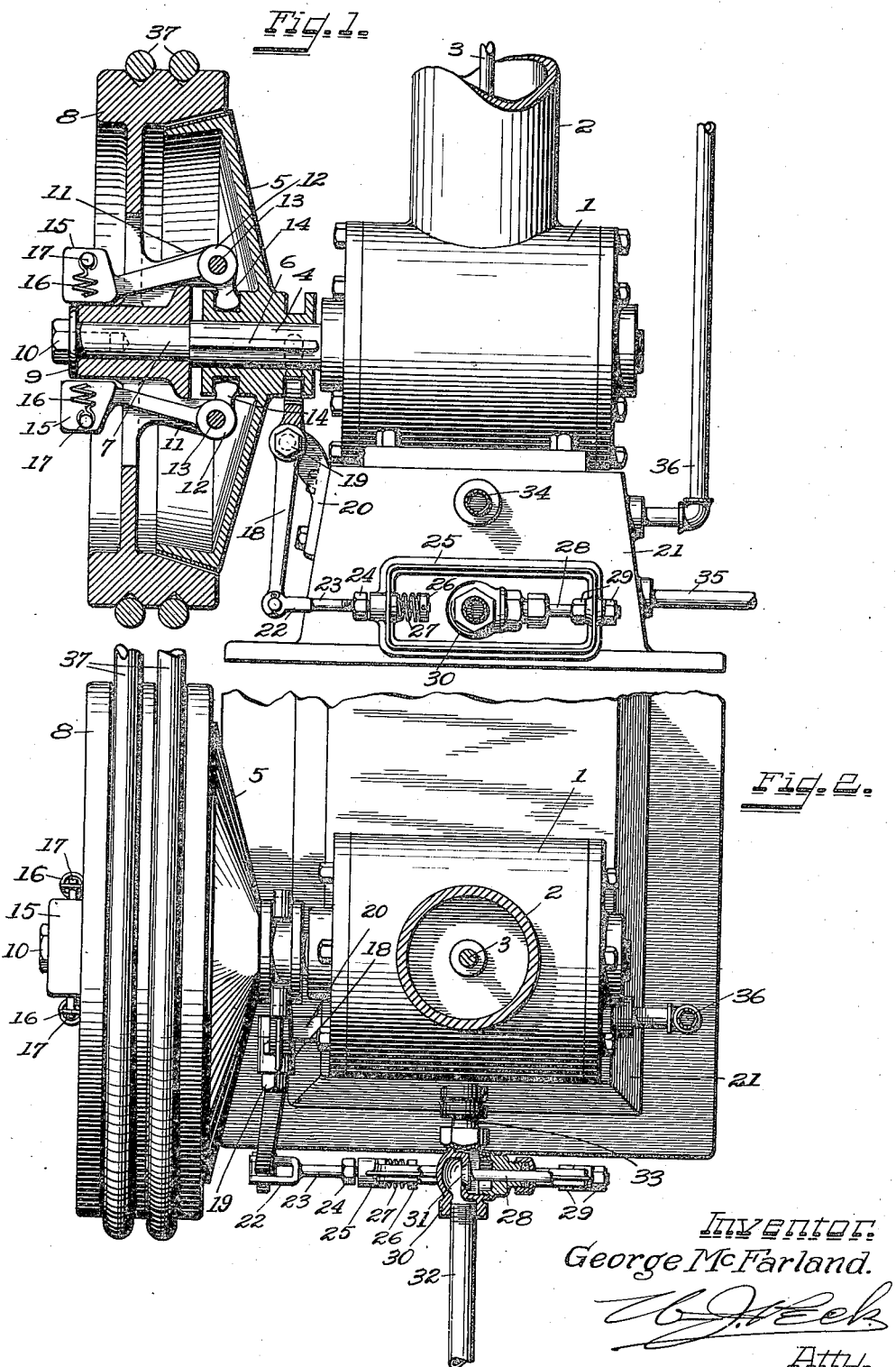

1,508,464

UNITED STATES PATENT OFFICE.

GEORGE McFARLAND, OF FORT MADISON, IOWA.

CLUTCH-CONTROLLED VALVE.

Application filed June 9, 1921. Serial No. 476,252.

*To all whom it may concern:*

Be it known that I, GEORGE McFARLAND, a citizen of the United States, and a resident of Fort Madison, in the county of Lee and State of Iowa, have invented certain new and useful Improvements in Clutch-Controlled Valves, of which the following is a full, clear, and exact description, reference being had to the accompanying drawing, forming part of this specification.

My invention relates more particularly to refrigerating machinery in which the refrigerating medium is passed through a cooler, the refrigerating machinery being for more or less intermittent operation, the cooler being supplied with water from any suitable source and means being provided to shut off the water when the machine is not in operation and to turn it on when the machine is in operation. Machines of this class are usually driven by a small electric motor and in order that the starting load may be absorbed, means are provided whereby a clutch is automatically caused to engage when the proper speed of the driving elements has been attained.

One object of my invention is the provision of a valve in the inlet pipe for the water circulation for the cooler and connecting this valve for operation with a clutch which is caused to engage when the machine is started and disengaged when the machine is stopped, the engagement opening the valve and the disengagement closing it.

Another object of my invention is to provide the machine with a loosely mounted energy storing element such as a fly wheel and mounting on the energy storing element means for causing the engagement of the clutch when the energy storing element has received sufficient momentum to accomplish the starting of the machine.

Other objects of my invention will appear and be described in the specification.

The novelty of my invention will be hereinafter more fully set forth and specifically pointed out in the claims.

In the accompanying drawing:

Fig. 1 is an elevation, partly in section, of a machine embodying my invention.

Fig. 2 is a plan view of Fig. 1.

The same numerals of reference are used to indicate identical parts in both figures.

As shown in the drawing, 1 represents a crank case of any suitable compressor 2 the cross head guide, and 3 the piston rod. The crank shaft 4 projects from one side of the crank case and carries a cone clutch 5 which is feathered to the shaft by the feather key 6 so that it may slide but not turn on the crank shaft. The crank shaft is reduced in diameter as shown at 7 and a fly wheel 8 mounted free to turn on the reduced portion and held against lateral movement toward the crank case by the shoulder formed by the reduction of the diameter of the crank shaft and away from the crank case by the washer 9 and cap screw 10.

The fly wheel 8 carries lugs 11 which in turn carry the operating arms 12, these arms being pivotally mounted between the lugs 11 by suitable pins 13, each arm being provided with a finger 14 which engages a groove in the hub of the clutch 5. Each of the arms 12 also carries a governor weight 15, the arms 12 and weights 15 being preferably arranged on opposite sides of the center of the fly wheel and a pair of springs 16, mounted on pins 17 which project laterally from the governor weights, are employed to draw these weights together when the machine is stopped.

The hub of the clutch 5 is also provided with another groove which is engaged by the forked upper end of lever 18 which is pivotally mounted as at 19 on a bracket 20 carried by the base 21.

The lower end of the lever 18 is connected to a fork 22, the rod 23 of which is provided with an adjusting nut 24 and passes through the yoke 25, the inner end of the rod being provided with a collar 26, between which and the yoke 25 a compression spring 27 is mounted.

The opposite side of the yoke 25 from that through which the rod 23 passes, embraces a valve stem 28 which is adjustably held in position with relation to the yoke by means of the nuts 29, the valve stem 28 passing into the valve body 30, as shown more clearly in Fig. 2 and carrying the valve closure 31.

The valve body 30 carries the water inlet pipe 32 and is in turn carried by the nipple 33 which is screwed into the base 21, the water outlet being shown in Fig. 1 at 34 while the ammonia or other refrigerating medium connections are shown at 35 and 36, the base 21 containing any suitable coil or other arrangement for confining the water and refrigerating medium to their proper channels.

As an easily applied and easily maintained means for driving the fly wheel 8, I have shown this wheel provided with two V grooves engaged by round belts 37, which also pass over the driving pulley of the electric motor which is preferably mounted on the base 21, though it is of course apparent that the fly wheel may be driven by a flat belt, a chain or through a train of gearing.

It is to be noted that when the parts are at rest as shown in Figs. 1 and 2 the spring 27 which bears against the yoke 25 is slightly compressed and the adjusting nut 24 has a slight clearance between it and the hub of the yoke 25 to the end that the valve closure 31 will be held to its seat yieldingly to insure its proper closing at all times.

The operation of the device is as follows:

As usually installed, machines of this character are provided with thermostatic control devices for starting and stopping their operation, though they may of course be manually controlled, in either case when the motor is started, the fly wheel 8 is set in motion, carrying with it the governor weights 15 which, when the proper speed has been attained are thrown outwardly by centrifugal force, thereby operating the fingers 14 to cause the engagement of the clutch 5, whereupon the energy stored in the fly wheel 8 is transmitted to the crank shaft 4 to start the compressor and carry it over its first two or three strokes.

The first portion of the engaging movement of the clutch 5 brings the nut 24 of the rod 23 against the hub of the yoke 25, and the continued movement of the clutch 5 moves the yoke 25 and with it the valve stem 28 to open the valve in the water inlet pipe thereby permitting the cooling water to enter the base 21, the compressor causing a circulation of the refrigerating meium through its proper channels in the base 21.

Upon the opening of the circuit through the motor, the parts come to rest and the springs 16 become effective to draw the governor weights toward the center of the fly wheel and restore the parts to the position shown in Fig. 1, the movement of the clutch being slightly in excess of that required to close the valve 31 against its seat in the body 30, the excess being employed to compress the spring 27 to the end that the adjustment between the travel of the clutch and the travel of the valve will not have to be constantly changed to cause the valve to seat.

By employing the fly wheel or energy storing element 8 and setting it in motion before the beginning of the operation of the compressor I am enabled to use a motor of only sufficient power to properly operate the machine after it has been started whereas if the motor were required to not only operate the compressor but to overcome its starting resistance, a much larger and more powerful motor is necessary.

By connecting the water inlet valve so that it is operated by the clutch for the energy storing element, the cooling water is admitted to the base only during the operation of the compressor thereby saving the amount of cooling water that would flow through the device during the time the compressor is not running which, especially in those installations for family use, would be considerably over one-half of the time.

By arranging the machine as above described, it may be installed and thermostatically controlled and its operation will be exceedingly economical, only sufficient power being consumed to actually operate the compressor and only sufficient water being used to operate the cooler during the periods of operation of the compressor.

Having thus fully described my invention, I claim:

1. In a machine the combination of driving and driven elements, a clutch between these elements, a clutch, centrifugal means for moving the clutch, and means controlled by the movement of the clutch for operating a valve.

2. The combination of a temperature changing container, a temperature changing medium control valve, a fly wheel, means of sufficient power to operate the machine after starting for driving the fly wheel, a clutch for the fly wheel, centrifugal means for moving the clutch into engaged position, and means controlled by the movement of the clutch for operating the control valve.

3. In a machine the combination of a driven portion, a driving portion of sufficient power to operate the driven portion after starting, an energy storing element driven by the driving portion, a clutch between the energy storing element and the driven portion of the machine, a governor operated by the driving portion of the machine, clutch engaging fingers carried by the governor for moving the clutch, a temperature changing container, a valve for controlling the admission of a temperature changing medium into the container and means controlled by the movement of the clutch for operating the valve.

4. In a machine the combination of a driving portion, of sufficient power to operate the driven portion after starting, a driven portion, an energy storing element operated by the driving portion, a governor carried by the energy storing element, a clutch between the energy storing element and the driven portion of the machine, clutch fingers between the governor and the clutch for moving the latter, a temparature changing container, a valve for controlling the flow of a temperature changing medium through the container, and connections between the valve and the clutch whereby when the clutch engages the energy storing element, the valve will be opened and when the clutch is disengaged from the energy storing element the valve will be closed.

5. In a machine the combination of a driving portion of sufficient power to operate the driven portion after starting, a driven portion, an energy storing element operated by the driving portion, a governor carried by the energy storing element, a clutch between the energy storing element and the driven portion of the machine, clutch fingers between the governor and the clutch for moving the latter, a temperature changing container, a valve for controlling the flow of a temperature changing medium throughout the container, and connections between the valve and the clutch for opening the valve when the clutch is engaged and closing it when the clutch is disengaged said mean comprising in part a yielding connection for closing the valve.

6. In a machine the combination of a driving portion of sufficient power to operate the driven portion after starting, a driven portion, an energy storing element operated by the driving portion, a governor carried by the energy storing element, a clutch between the energy storing element and the driven portion of the machine, clutch fingers between the governor and the clutch for moving the latter, a temperature changing container, a valve for controlling the flow of a temperature changing medium through the container, a positive connection between the clutch and the valve for opening the valve when the clutch is engaged, and a yielding connection between the clutch and the valve to close the valve when the clutch is disengaged.

GEORGE McFARLAND.